United States Patent [19]

Snead

[11] Patent Number: 4,884,769
[45] Date of Patent: Dec. 5, 1989

[54] AERIAL RECOVERY PARACHUTE SYSTEM

[75] Inventor: Edwin de S. Snead, Georgetown, Tex.

[73] Assignee: Davis Aerospace Corp., Canyon Lake, Tex.

[21] Appl. No.: 151,305

[22] Filed: Feb. 1, 1988

[51] Int. Cl.4 .................... B64D 17/02; B64D 17/24
[52] U.S. Cl. .................... 244/145; 244/137.1
[58] Field of Search ............... 244/137.1, 137.4, 142, 244/145

[56] References Cited

U.S. PATENT DOCUMENTS

| Re. 26,865 | 4/1970 | Ferguson | 244/145 |
|---|---|---|---|
| 1,793,729 | 2/1931 | Askam. | |
| 2,942,815 | 6/1960 | Gross et al. | 244/137 |
| 3,137,465 | 6/1964 | Mulcahy | 244/142 |
| 3,207,480 | 9/1965 | Fulton, Jr. | 244/142 |
| 3,351,325 | 11/1967 | Cotton | 258/1.4 |
| 3,385,539 | 5/1968 | Ewing et al. | 244/142 |
| 3,389,880 | 6/1968 | Ferguson | 244/137 |
| 3,434,680 | 3/1969 | Ferguson | 244/142 |
| 3,511,458 | 5/1970 | Rolandelli | 244/142 |
| 3,655,151 | 4/1972 | Ferguson | 244/142 |
| 3,822,844 | 7/1974 | Sutton | 244/145 |
| 3,893,641 | 7/1975 | Sutton | 244/145 |
| 4,389,031 | 6/1983 | Whittington | 244/145 |
| 4,406,433 | 9/1983 | Radkey et al. | 244/145 |

OTHER PUBLICATIONS

*Aviation Week*, "Helicopter Demonstrates Chute Recovery", No. 24, vol. 72, p. 104, Jun. 13, 1960.
J. Carroll, "Some Tether Applicating with Small Launch Vehicles", 1987, pp. 1-7.

*Primary Examiner*—Sherman D. Basinger
*Assistant Examiner*—Rodney Corl
*Attorney, Agent, or Firm*—Harrison & Egbert

[57] ABSTRACT

A mid-air aerial recovery system comprising a payload, a parachute, and an aerial engagement apparatus. The parachute is connected to the payload. The parachute has a sufficient size to support the weight of the payload. The parachute has a plurality of suspension lines extending from the payload to a canopy of the parachute. The aerial engagement apparatus is a loop rope fastened to the parachute and extending outwardly beyond the canopy of the parachute. This loop rope forms a reception area. The parachute is a ram-air parachute. The loop rope is fastened at one end to the payload and extends along the suspension lines of the parachute and is attached to a leading edge of the canopy.

8 Claims, 5 Drawing Sheets

AERIAL RECOVERY PARACHUTE SYSTEM

TECHNICAL FIELD

The present invention pertains to parachute payload carrying systems, which are adapted to be caught and recovered in mid-air by recovery craft and, more particularly, relates to a novel parachute system, which is particularly designed for quick and efficient mid-air recovery.

BACKGROUND ART

For many years, parachutes have been used for the final flight and recovery stage of spacecraft, target drones, camera film, and similar items. A problem with ordinary parachutes, circular or conical design, is that they descend almost vertically through the relative airstream and consequently are carried generally with the wind. This makes the landing point highly uncertain. Additionally, the rate of descent is in the order of fifteen to twenty-five feet per second. This results in a fairly rough landing on solid surfaces. As a result, most of these landings have been conducted on water. These water landings involve other complexities, such as auxiliary flotation devices, to keep the payload from sinking. The water landings also require that the payloads be of a type that cannot be damaged by water or must be of a type that are protected against damage by water.

Ram-air inflated parachutes, such as those used by sports sky divers, are able to move horizontally as much as three or four feet for every foot of vertical descent. This allows the parachutes to make headway into a fairly stiff wind of up to twenty or thirty knots. Additionally, these ram-air inflated parachutes are steerable so as to allow a pilot to select a landing spot with substantial precision. For instance, sport jumpers commonly land within a few feet of their selected targets. The ram-air parachutes also have the ability to "flare" before a landing. This makes it possible to reduce both forward speed and the rate of vertical descent in the last few seconds beofre touchdown. Under the control of a competent pilot, these ram-air parachutes can make a much more precise and gentle touchdown than an ordinary circular parachute.

Ram-air parachutes are steered by pulling down about two feet on a pair of steering toggles which lower trailing edge flaps at the rear of the canopy. Pulling down on the right flap steers the canopy to the right and pulling down on the left flap steers the canopy to the left. The pulling of both flaps simultaneously results in the flare. This reduces forward speed and vertical descent rate simultaneously for a short period time. A ram-air parachute can be controlled by an on-board pilot or can be controlled by servo motors operated by radio or on-board auto-pilots. Such servo motor controlled ram-air parachutes can also be assisted by an on-board computer. The final flare and touchdown can be facilitated by an on-board radar altimeter.

Several prior-art United States patents show various parachute systems for mid-air load recovery. U.S. Pat. No. 2,942,815, issued to R. J. Gross et al., on June 28, 1960, describes an apparatus for retrieving objects descending by parachute. The parachute used in this invention is of the standard circular design. This parachute has a plurality of cone-shaped extensions extending outwardly beyond the canopy of the parachute. A retrieving line extends between the points of each of these cone-shaped extensions. A grappling hook utilized by an aircraft serves to connect with this line.

U.S. Pat. No. 3,137,465, issued to G.R. Mulcahy, Jr., on June 16, 1964, discloses a load recovery parachute system. In this system, a drogue parachute is released from the top of the standard circular parachute. A helicopter with an extending hook intercepts the drogue parachute. After intercepting the drogue parachute, the main parachute collapses and the load is carried by the intercepting helicopter.

U.S. Pat. No. 3,389,880, issued on June 25, 1968, and Reissue Pat. No. 26,865, issued on Apr. 21, 1970, to O. B. Ferguson, disclose another type of parachute system for mid-air load recovery. This system also utilizes a drogue parachute that is released outwardly from the top of a standard circular parachute. A helicopter then engages the lines of a drogue parachute so as to intercept the descending object. The drogue parachute is designed so as to enhance the ability of the grappling hook to engage the drogue parachute.

Each of these prior-art patents utilizes the standard circular-type of parachute. As stated previously, the problem with the standard parachutes is that the rate of vertical descent is much greater than the rate of horizontal movement. In order for a helicopter to intercept such a parachute, the helicopter must descend toward the parachute and descend through the helicopter's prop wash. This would create a significant amount of turbulence for the helicopter and make the task of engaging the parachute a difficult task. In order for a helicopter to descend at the rate of the standard circular-type parachute, the helicopter will have to assume a "power shutoff" situation. The helicopter will descend at the rate of the parachute when power is disengaged from the helicopter blades. Unfortunately, this is not an optimal situation for the pilot of the helicopter or for the purpose of intercepting the descending object. It is preferably for the helicopter to be moving horizontally at a much lower rate of descent than would be provided by these prior-art patented systems.

It is an object of the present invention to provide an aerial recovery system which enhances the ability of a helicopter to retrieve the load.

It is another object of the present invention to provide an aerial recovery system which provides a large target for interception.

It is another object of the present invention to provide an aerial recovery system which eliminates the need for water landings.

It is still a further object of the present invention to provide an aerial recovery system that reduces the risk of damage to the descending object.

These and other objects and advantages of the present invention will become apparent from a reading of the attached specification and appended claims.

SUMMARY OF THE INVENTION

The present invention is a mid-air aerial recovery parachute system that comprises a payload, a parachute, and an engagement loop. The parachute is connected to the payload by a plurality of suspension lines. The parachute should have a sufficient size to support the weight of the payload. The suspension lines connect the payload to the canopy on the parachute. The engagement loop is fastened to the parachute and extends outwardly beyond the canopy of the parachute so as to form a reception area. This engagement loop comprises a rope that is fastened to the edge of the canopy. This rope is fastened at one end to the payload and extends along the suspension line. At the other end, the other end of the rope is fastened to the payload and extends along the opposite side of the suspension lines and engages the opposite end of the forward edge of the canopy.

The canopy is a ram-air parachute. This canopy has a relatively linear forward edge. The suspension lines extend radially from the payload to the forward edge of the parachute. The rope extends from the payload along the outer suspension lines and engages the forward edge of the canopy. This rope extends outwardly for a distance greater than the wingspan of the canopy. The rope forms an outwardly extending loop as the parachute falls to earth. The canopy should have a size of greater than one square foot per pound of payload for payloads of less than 100 pounds. Alternatively, the canopy should have a size of greater than 0.2 square feet per pound for payloads of greater than 10,000 pounds.

The present invention also comprises a method of retrieving the payload. This method comprises the steps of: (1) deploying the payload and the parachute from a desired altitude; (2) releasing the parachute so as to inflate the parachute and to slow the descent of the object; (3) manipulating the parachute such that the parachute is moving horizontally at a rate more than twice the rate of vertical descent; (4) maneuvering an aircraft into close proximity with the outwardly extending loop from the parachute; (5) grappling the outwardly extending loop such that the object is controlled by the movement of the aircraft; and (7) transporting the object to a desired location.

The step of grappling comprises the step of grappling the outwardly extending loop with a hook extending downwardly from the aircraft, pulling the loop forward of the leading edge of the parachute, and collapsing the parachute such that the parachute will exert minimal air resistance. The outwardly extending loop extends rearward of the forward edge of the parachute. The aircraft is a helicopter. The step of maneuvering comprises the steps of hovering the helicopter at an approximately level altitude, releasing a grappling hook from the helicopter such that the grappling hook descends toward the loop, and manipulating the grappling hook so as to become engaged with the loop.

The step of transporting comprises the steps of pulling the object in a desired horizontal direction toward a desired location, lowering the payload from the helicopter toward a receiving air at this desired location, and releasing the loop from the grappling hook so as to separate the object from the helicopter at a desired location. The receiving area is a shock-absorbing surface on the deck of a ship.

BEST MODE FOR CARRYING OUT THE INVENTION

Figure 1:
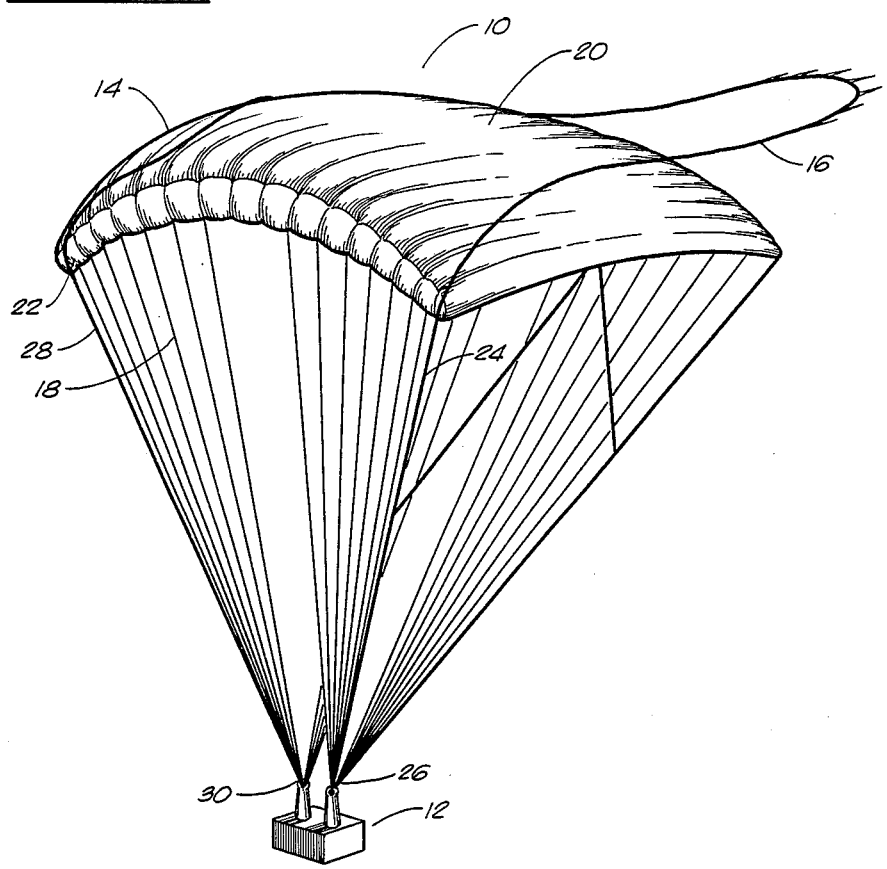
FIG. 1 is a perspective view showing the aerial recovery system in accordance with the present invention.

Referring to FIG. 1, there is shown at 10 the mid-air aerial recovery parachute system in accordance with the present invention. The aerial recovery parachute system 10 comprises a payload 12, parachute 14, and aerial engagement apparatus 16. Parachute 14 is connected by a plurality of suspension lines 18 to payload 12. Parachute 14 should be a ram-air type of parachute having sufficient size to support the weight of the payload 12. A ram-air canopy 20 is connected by the suspension lines to payload. The aerial engagement apparatus 16 is a loop rope fastened to the parachute 14 and extending outwardly beyond the canopy 20 of the parachute. This loop rope 16 forms a reception area for the mid-air recovery system.

Payload 12 can be any desired object or payload. Ideally, payload 12 is a space launch component such as a stage of a spacecraft, a target drone, camera film, and similar apparatus. The type of payload is not important to the configuration of the present invention.

Parachute 14 is a ram-air type of parachute. Ram-air parachutes are known in the prior art and are designed to include a fabric parachute body having a plurality of individual cells arranged side-by-side along the width of the parachute and inflatable to assume an air foil section having a constant angle of attack across the width of the parachute. The major suspension lines extending from the payload to the parachute are equal in length so that the parachute, as viewed from the front, assumes a curved shape when inflated. Conventional ram-air parachutes are shown in U.S. Pat. Nos. 3,285,546, 3,524,613, and 3,724,789. Ram-air parachutes have the quality of being able to move horizontally as much as three or four feet for every foot of vertical descent. It is also possible to guide the ram-air parachute by proper controls.

The aerial reception apparatus 16 is a rope that is fastened to the forward edge 22 of the canopy 20 of parachute 14. Rope 16 extends along one outer suspension line 24 and is attached at its end 26 to payload 12. The other end of the loop rope is attached to the other end of the forward edge 22 of the canopy 20 of parachute 14. This other end of the loop rope 16 extends along a suspension line 28 opposite that of suspension line 24. The loop rope 16 is also fastened at 30 to payload 12. Loop rope 16 is larger than the suspension lines and should have a quality and strength sufficient to support a free-hanging load represented by payload 12. The forward edge 22 of canopy 20 has a relatively linear forward edge. During descent, the canopy 20 is curved. The loop rope 16 extends outwardly beyond the canopy 20 for a distance greater than the wingspan of canopy 20. Ideally, loop rope 16 will cover a large enough area for the easy reception by an aircraft. As the parachute 14 descends through the air, the aerodynamic forces will cause the loop rope 16 to form a loop behind the canopy and slightly below the canopy. The loop rope is stabilized by the relative wind affecting parachute 14.

It is important that the canopy 20 have a size suitable for the payload 12. Where the payload is less than 100 pounds, the canopy should have a size greater than one square foot per pound of payload. Where the payload is greater than 10,000 pounds, the canopy should have a size of greater than 0.2 square foot per pound for the payload. Suitable servo mechanisms, remote control devices, and altimeters can be included within the parachute 14, or made a part of the payload 12. Such devices will facilitate the remote control and remote landing of the aerial recovery system 10 of the present invention. Such servo mechanisms can assist in controlling the descent of the parachute 14, the final flare, and the touchdown of the parachute. These controls will also facilitate the reception of the parachute by an aircraft.

Figure 2:
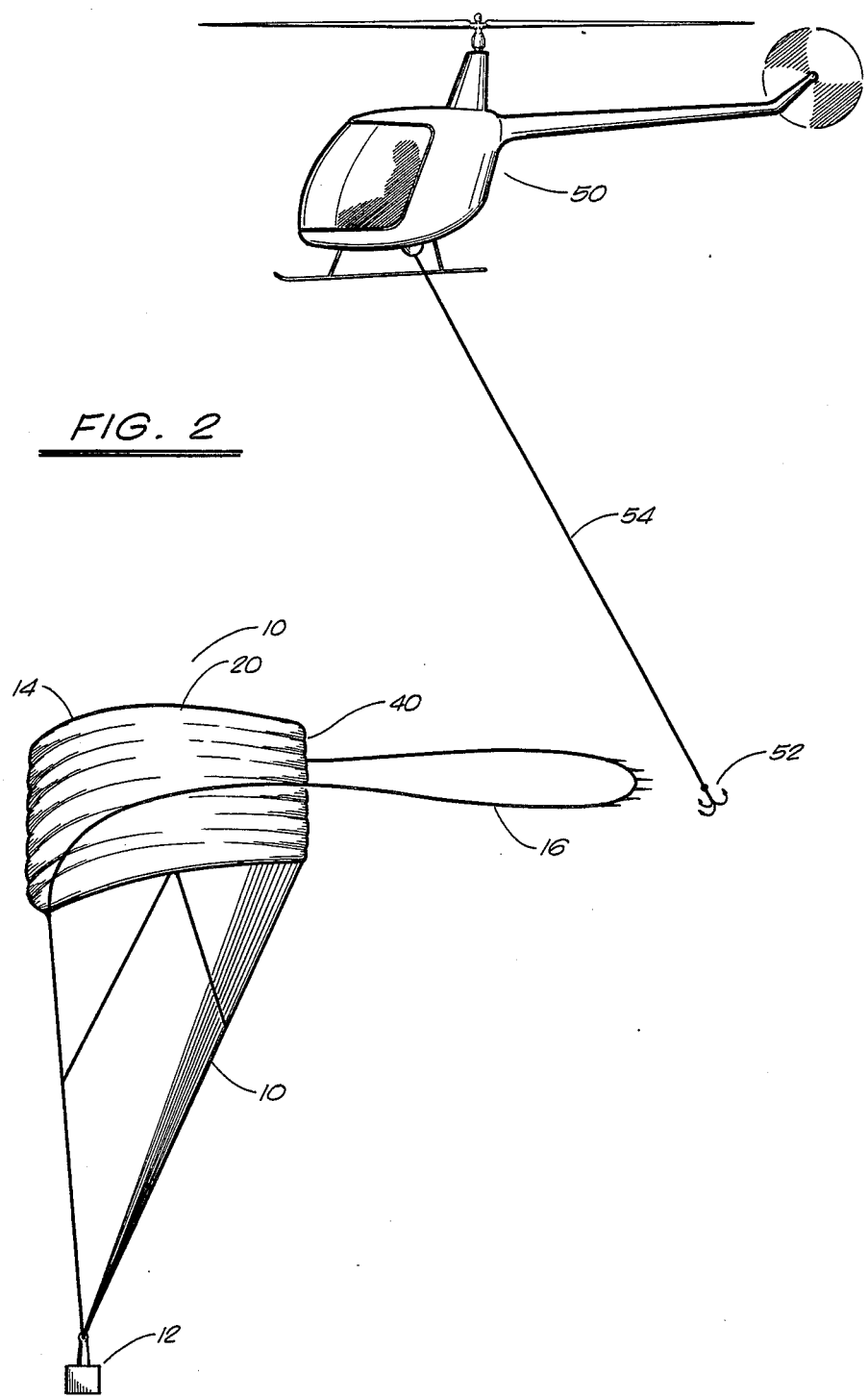
FIG. 2 illustrates the first stage in the aerial recovery of the payload.

FIG. 2 illustrates the first stage in the method for the recovery of objects and payloads in accordance with the present invention. As can be seen in FIG. 2, the aerial recovery system 10 is descending to earth, through the air, in typical fashion. While descending to earth, the suspension lines 18 are taut, and the loop rope 16 extends outwardly beyond the back edge 40 of the canopy 20 of parachute 14. The air will stablize the loop rope behind the canopy 20 so that it is in proper position for reception by the helicopter 50. Although helicopter 50 is shown in FIG. 2, it may be also possible to intercept the object 12 by the use of other forms of aircraft.

Initially, the object 12 and the parachute 14 are deployed from a desired altitude. This deployment will cause the parachute 14 to inflate and to slow the descent of the object 12. By remote means, it is desirable to have the parachute moving horizontally at more than twice the rate of vertical descent. Ideally, this rate should be equivalent to three feet of horizontal movement for every foot of vertical descent.

Helicopter 50 is then maneuvered into close proximity with the aerial engagement apparatus 16 extending outwardly beyond parachute 14. When the helicopter 50 is in proper position, the grappling hook 52 is lowered by rope 54 from helicopter 50. Through proper manipulation, grappling hook 52 will engage the loop rope 16 such the the parachute 14 is intercepted by helicopter 50.

Figure 3:
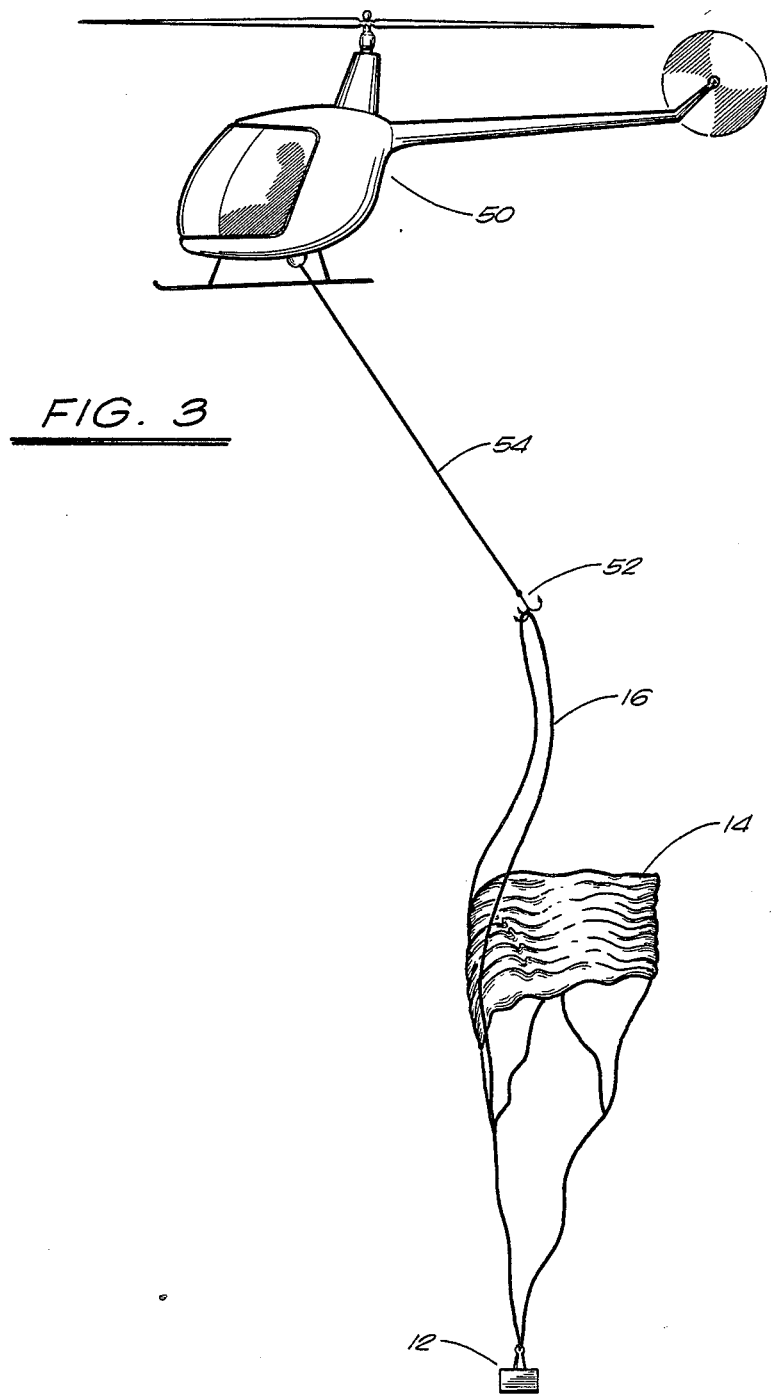
FIG. 3 illustrates the second stage in the recovery of the descending object.

FIG. 3 illustrates this interception technique. As can be seen, the grappling hook 52 on rope 54 has engaged the loop rope 16 of parachute 14. This is accomplished by the simple grasping by the grappling hook 52 of the loop rope 16. The helicopter continues to move horizontally forward at a rate greater than the horizontal forward movement of parachute 14. As this forward movement continues, parachute 14 will begin to collapse and offer minimal air resistance to the transportation of the object 12 to a desired location.

Figure 4:
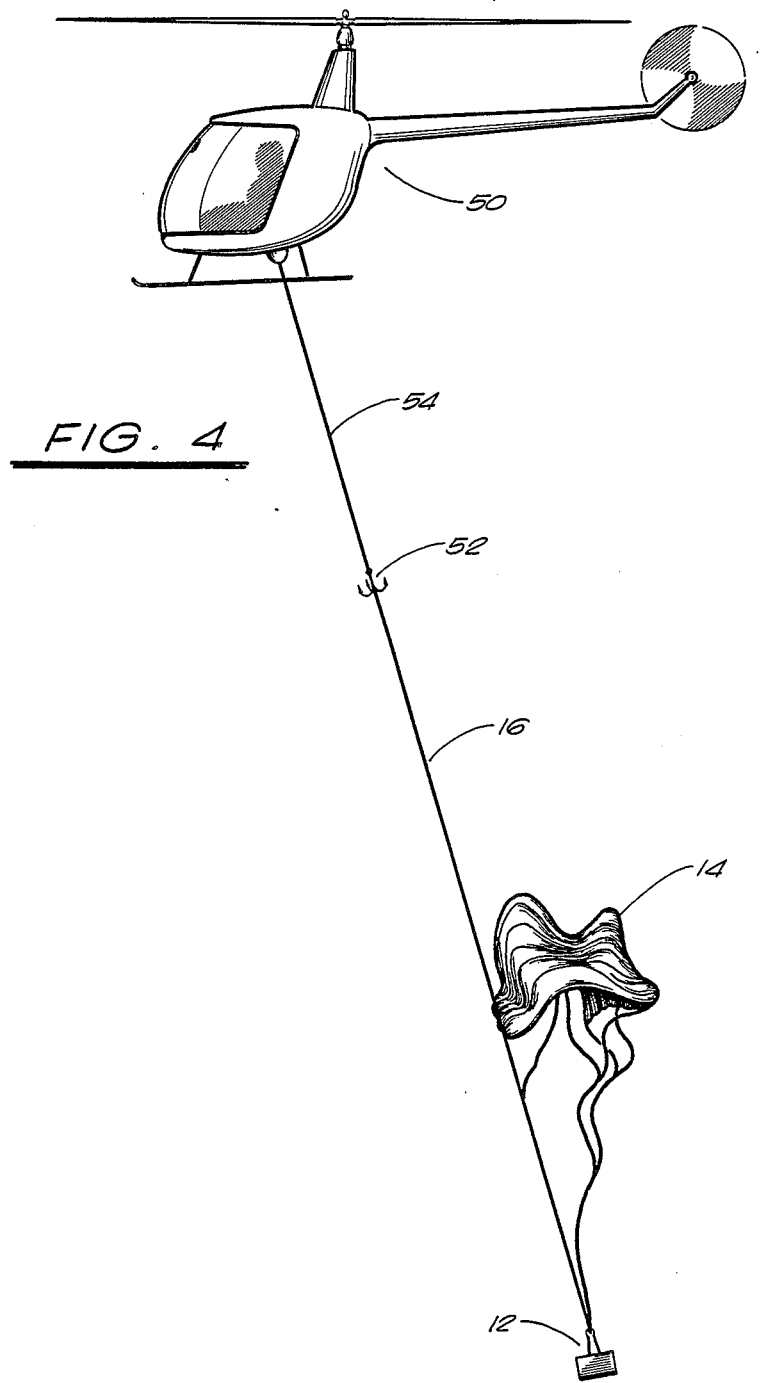
FIG. 4 illustates the third stage in the recovery of the descending object.

FIG. 4 shows the collapsing of parachute 14. The collapsing of the parachute 14 is important because it eliminates many of the air effects and turbulences that would otherwise hamper the transportation of object 12. As can be seen in FIG. 4, the loop rope 16 is pulled taut by the helicopter 50 such that helicopter 50 assumes the weight of the load imparted by object 12. Helicopter 50, along with the rope 54, the grappling hook 52 and the loop rope 16, should have a capacity suitable to support the weight of object 12. Helicopter 50 may then move in a desired direction so as to transport the object 12 to the unloading point.

Figure 5:
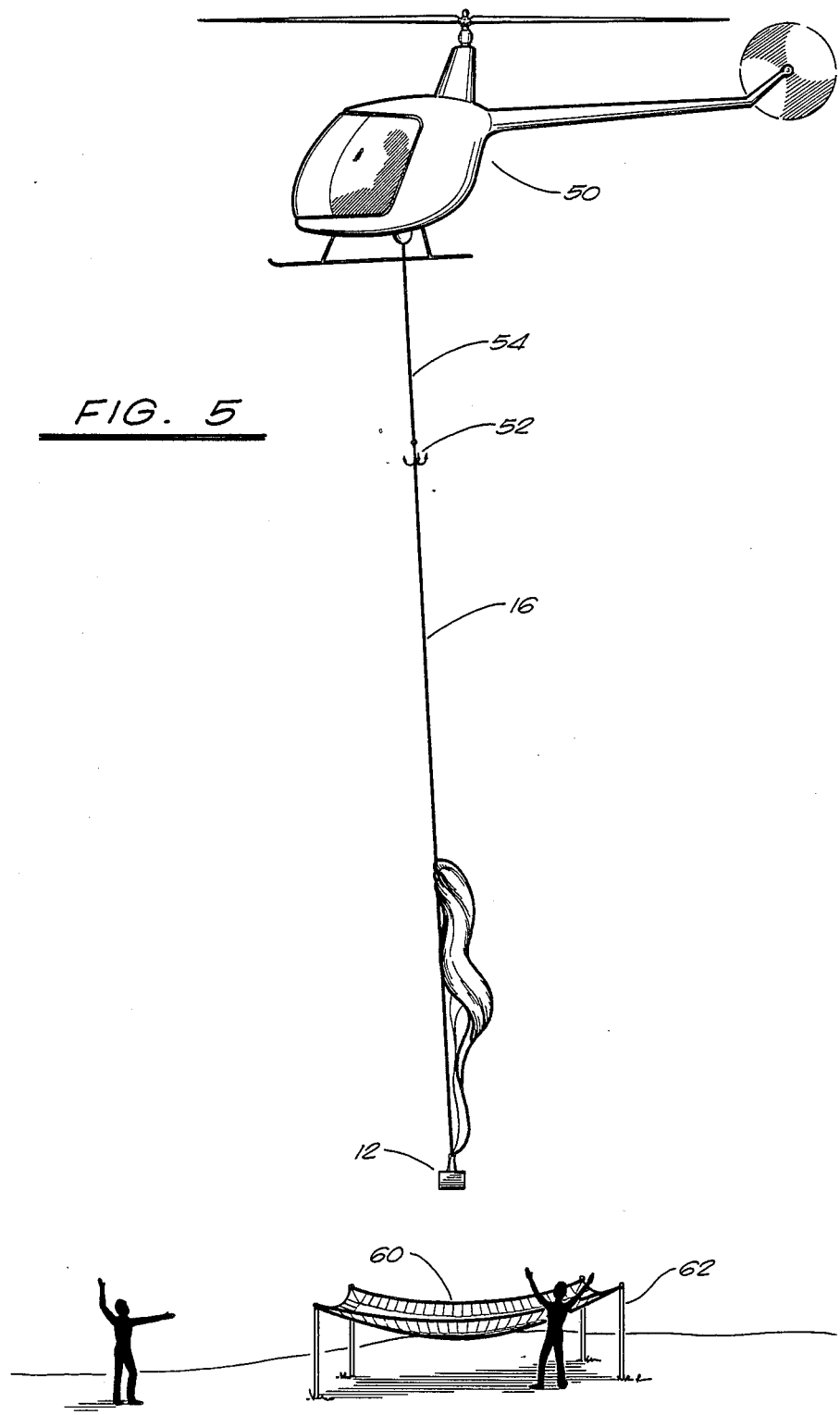
FIG. 5 illustrates the final stage of the recovery of the payload and its transport to a desired location.

FIG. 5 illustrates the unloading by helicopter 50 of object 12. As can be seen in FIG. 5, there is a net 60 fastened to poles 62 which are mounted on a deck of ship (not shown). When in the desired location, helicopter 50 will continue to hover in a stationary position. The rope 54 is lowered such that object 12 will drop into net 60. When the object 12 is received by net 60, slack will be introduced into the loop rope 16 so as to allow the disengagement of grappling hook 52 from the rope 16. When the grappling hook 52 is disengaged from the end of loop rope 16, the object 12 has been properly positioned and transported to its desired location.

It should be noted that net 60 is not critical to the concept of the present invention. The payload can be deposited on the deck of a ship, or on land, on a cushion, or any other type of shock-absorbing surface.

The present invention offers a number of advantages over prior-art aerial recovery systems. First, the parachute is steerable so as to place it in proper position for reception by the helicopter. Additionally, the prop wash effects, on both the parachute and the helicopter, are eliminated because the ram-air parachute is capable of moving horizontally at three times the rate of vertical descent. Secondly, the object can be transported to earth without the risk of damage incurred by landing in water or of shock received by abrupt dropping on solid surfaces.

The foregoing disclosure and description of the invention is illustrative and explanatory thereof. Various changes in the method steps, as well as in the details of the illustrated system, may be made within the scope of the appended claims without departing from the true spirit of the invention. The present invention should only be limited by the following claims and their legal equivalents.

I claim:

1. A mid-air aerial recovery parachute system comprising:
   a payload;
   a parachute means connected to said payload, said parachute means having a sufficient size to support the weight of said payload, said parachute means having a plurality of suspension lines extending from said payload to a canopy of said parachute means; and
   a loop means fastened to said parachute means and extending outwardly beyond said canopy of said parachute means, said loop means for forming a parachute reception area, said loop means comprising a rope extending from and fastened to an edge of said canopy, said rope fastened at one end to said payload and extending along said suspension lines, said rope being larger than said suspension lines, said rope fastened at the other end to said payload and extending along said suspension lines, said rope attached to opposite sides of said edge of said canopy, said canopy being a ram-air parachute, said canopy having a relatively linear forward edge, said suspension lines extending from said payload to said forward edge, said rope extending from said payload along the outer suspension lines, said rope engaging the forward edge of said canopy, said rope extending outward for a distance greater than the wingspan of said canopy.

2. The system of claim 1, said rope forming an outwardly extending loop as said parachute means falls through air.

3. The system of claim 1, said canopy having a size greater than one square foot per pound of payload for payloads of less than one hundred pounds.

4. The system of claim 1, said canopy having a size of greater than 0.2 square feet per pound of payloads greater than ten thousand pounds.

5. A mid-air aerial recovery parachute system comprising:
   a payload;

a ram-air parachute connected by suspension lines to said payload, said ram-air parachute having a sufficient size to support said payload; and aerial engagement means connected to said ram-air parachute extending outwardly beyond the top of said ram-air parachute, said aerial engagement means suitable for reception by an aircraft, said aerial engagement means comprising a loop rope fastened to the forward edge of said ram-air parachute, said loop rope having a strength sufficient to support the weight of said payload, said loop rope fastened to opposite ends of the forward edge of said ram-air parachute, said loop rope extending rearward of said forward edge a distance at least the length of the wingspan of said ram-air parachute.

6. The system of claim 5, said loop rope attached at one end to said payload and extending from said payload along one of said suspension lines, the other end of said loop rope attached to said payload and extending along an opposite suspension line, said loop rope connected at opposite sides of said forward edge of said ram-air parachute.

7. The system of claim 5, said ram-air parachute having a canopy having a size of greater than one square foot per pound of payload for payloads of less than one hundred pounds.

8. The system of claim 5, said ram-air parachute having a canopy having a size of greater than 0.2 square foot per pound for payloads of greater than ten thousand pounds.

* * * * *